United States Patent Office 3,637,636
Patented Jan. 25, 1972

3,637,636
ETHYLENE POLYMERIZATION IN THE PRESENCE OF COMPLEX NICKEL CATALYSTS CONTAINING BENZOIC ACID DERIVATIVE LIGANDS
Ronald Bauer, Orinda, and Harold Chung, Lawrence George Cannell, and Wilhelm Keim, Berkeley, Calif., and Henry van Zwet, Amsterdam, Netherlands, assignors to Shell Oil Company, New York, N.Y.
No Drawing. Filed Jan. 15, 1970, Ser. No. 3,191
Int. Cl. C08f 3/06, 1/58
U.S. Cl. 260—94.9 C
15 Claims

ABSTRACT OF THE DISCLOSURE

Ethylene is polymerized in the presence of a catalyst which is the reaction product of a nickel compound with a benzoic acid derivative ligand substituted with one or more substituents selected from the group consisting of —SH, —CN, —N($R^1$)($R^2$), —$OR^3$ and alkyl of up to 8 carbon atoms; $R^1$, $R^2$ and $R^3$ can be hydrogen or alkyl of up to 8 carbon atoms with the proviso that at least one of the substituents is —SH, —CN, —N($R^1$)($R^2$) or —$OR^3$ The nickel compounds comprise olefinically unsaturated compounds of from 2 to 20 carbon atoms. The preferred nickel compound is bis-cyclooctadiene-1,5-nickel.

---

A variety of polymerization catalysts, both homogeneous and heterogeneous, has been utilized to convert ethylene into products of higher molecular weight. One widely used class of catalyst is the so-called "Ziegler-type" which is the result of the reaction of a higher valence transition metal compound and a Group I, II or III metal, alloy, hydride or organic derivative of the Group I, II or III metal having an organo-metallic bond.

The present invention is directed toward the polymerization of ethylene and to novel compositions used at catalysts in these polymerizations, which catalysts are not within the class of Zeigler-type catalysts. The catalyst composition of this invention is the product of the reaction of a nickel compound comprising an atom of nickel in complex with an olefinically unsaturated compound of from 2 to 20 carbon atoms, preferably bis-1,5-cyclooctadiene, with a benzoic acid derivative ligand substituted with one or more substituents selected from the group consisting of —SH, —CN, —N($R^1$)($R^2$), —$OR^3$, and alkyl of up to 8 carbon atoms where $R^1$, $R^2$ and $R^3$ can be hydrogen or alkyl of up to 8 carbon atoms with the proviso that at least one of the substituents is —SH, —CN, —N($R^1$)($R^2$) or —$OR^3$ Typical examples of these benzoic acids include 2-mercaptobenzoic acid, 3,5-diaminobenzoic acid, 3-aminobenzoic acid, 4-cyanobenzoic acid, 4-N,N-dimethylaminobenzoic acid and 4-aminobenzoic acid. In the reaction the ratio of nickel compound to acid ligand can be between 0.5:1 to 1:12 with a preferred range of 1:1 to 1:4.

U.S. Pat. 3,035,090, Dunn, issued May 15, 1962, relates to the production of acrylic acid esters. The patent teaches interacting acetylene, carbon monoxide and an alcohol in the presence of a complex combination obtained by the admixture of a nickel halide with an organic mercapto carboxylic acid wherein the mercapto radical can be in the ortho, meta or para position relative to the carboxyl radical. The patent's disclosure is limited to complexes prepared from electrostatically bonded nickel halide ionic compounds. The present invention relates to the polymerization of ethylene in the presence of a nickel compound wherein the nickel is in complex with an olefinically unsaturated compound.

U.S. Pat. 3,130,214, Coffield et al., issued Apr. 24, 1964, relates to ionic organometallic compounds and their preparation. Specifically the compounds have the general formula:

[AMCy]$_x^+$X$^-$ wherein A is an aromatic compound bonded in coordination to M which is a Group VIII metal which has an atomic number of 10 less than the next higher rare gas of the periodic table. Cy is a cyclopentadienyl group, X is an anion and $x$ is the valence of the anion X. Examples of A include mesitylene, toluene, benzene and styrene. The patent does not disclose any substituted aromatic compounds except hydrocarbonyl substituted aromatics. The anion X can be a halide, nitrate, nitrite, sulfite, sulfate, formate, acetate, benzoate, stearate, laurate, oleate or any inorganic or organic anion. The compounds are used as antiknock additives to fuel. They may be incorporated into paints, varnishes, inks, resins or oil enamels. They can be chemical intermediates or they can be used in the manufacture of therapeutic materials or agricultural chemicals or they can be added to wax compositions.

Applicants have found that a composition which is the product of the reaction of a nickel compound comprising an atom of nickel in complex with an olefinically unsaturated compound with a benzoic acid derivative ligand as described supra is surprisingly useful as a catalyst for the polymerization of ethylene. This composition is preferably described as the reaction product of a nickel compound with a benzoic acid derivative ligand of the structure of Formula I (I)
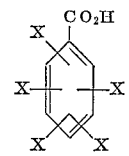

wherein the X's are the same or different substituents selected from the group consisting of

—SH, —CN, —N($R^1$)($R^2$), —$OR^3$ hydrogen and alkyl of up to 8 carbon atoms, $R^1$, $R^2$ and $R^3$ can be hydrogen or alkyl of up to 8 carbon atoms with the proviso that at least one of the substituents is —SH, —CN, —N($R^1$)($R^2$) or —$OR^3$. The nickel compound employed as a catalyst for the polymerization process may be described as comprising an atom of nickel from a biscyclooctadiene nickel (O) complex or like complex of nickel (O) or nickel (I) further complexed with a benzoic acid ligand. This description is suitable but is not preferred for the reasons infra.

Although it is not desired to be bound by any particular theory, it appears likely that the catalyst molecule undergoes chemical transformations during the course of the polymerization reaction possibly involving coordination and/or bonding of ethylene to the nickel moiety. However, it appears likely that the benzoic acid ligand remains complexed and/or chemically bonded to the nickel moiety during the course of the reaction and that this complex of nickel and benzoic acid derivative ligand is the effective catalytic species of the polymerization process. In any event, the ligand is an essential component of the catalyst and, provided the nickel catalyst contains the required acid ligand, the nickel catalyst may be complexed with a variety of additional organic complexing ligands.

The catalysts of the present invention are typically formed in situ in the reaction medium but the present invention encompasses the nickel catalysts as described regardless of what sequence is used for catalyst preparation and polymerization. Whether the catalyst is formed and perhaps even identified prior to its use as a polymerization catalyst or is formed in the reaction medium while the polymerization is proceeding, its exact active form during the polymerization reaction is not precisely ascertainable. For this reason the catalyst is preferably described as the product of the reaction of the nickel compound with a benzoic acid derivative ligand as described.

When the catalyst is characterized as the product of the reaction of a nickel compound with the acid wherein the nickel compound is selected from the group consisting of nickel (0) compositions and nickel (I) compositions, the characterization does not encompass nickel which is reducible to a lower positive valence state. In the case of the Ni (I) compositions, the nickel is capable of being reduced to a lower (non-positive) valence state which is zero (0). The nickel (0) compositions comprise an atom of nickel complexed or chemically bonded to sufficient complexing ligands to satisfy the coordination number of the nickel atom which typically but not invariably is four. However, because of the difficulty in ascribing oxidation states or valences to transition metal-containing catalysts, the catalysts of the present invention are preferably defined in terms of reaction products as above or in terms of an empirical representation as described below rather than in precise bonding or oxidation state terms.

In another manner of describing the catalysts of the present invention, the compositions are represented by the Formula II:

(II) 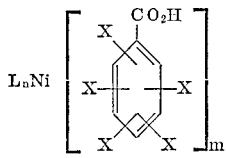

wherein the benzoic acid ligand is described as defined in Formula I, L is an olefinically unsaturated compound of from 2 to 20 carbon atoms, of up to 4 olefinic linkages, and of up to 3 carbocyclic rings, $n$ and $m$ are selected from numbers of from 1 to 3, and the sum of $n$ and $m$ may be, but is not necessarily equal to 4. However as pointed out above it is preferred to describe the catalyst as the reaction product of the nickel compound and the acid ligand and it is to be understood that Formula II is meant only to represent empirical compositions and that the precise nature of the bonding between the benzoic acid ligand and the nickel moiety is not definitely known. However, it is considered likely that the nickel is in a low valence state, i.e., zero valent or mono-valent nickel, which valence state is dependent on the nature of the chemical bonding between the nickel moiety and the ligand.

A particularly preferred class of olefinically unsaturated compounds for L are olefins from 2 to 12 carbon atoms represented by the Formula II (III) 

wherein R′ and R″ independently are hydrogen, alkyl, cycloalkyl, alkenyl, cycloalkenyl, aralkyl, aryl or alkaryl of up to 8 carbon atoms, with the proviso that the R′ and R″ groups may together form a divalent aliphatic moiety of from 2 to 10 carbon atoms of up to three additional olefinic double bonds as the sole carbon-carbon unsaturation.

Illustrative olefins of Formula III therefore include ethylene, propylene, 2-butene, 1-pentene, 1-hexene, 1-octene, 1-decene, butadiene, isoprene, 1,3,5-octatriene, 1,3,7-octatriene, cyclopentene, cycloheptene, cyclopentadiene, cyclohexa-1,3-diene, cycloocta-1,5-diene, cyclooctatriene, cyclooctatetraene and cyclododecatriene.

The particularly preferred organic complexing ligand L for this invention is cyclooctadiene. This moiety is unique and gives particularly good results in the polymerization of ethylene as will be shown later. The cyclooctadiene, in bonding terms, is $\pi$ bonded to the nickel as opposed to the sigma bonding between nickel and for instance cyclopentadienyl chelates or at least is bonded to the nickel in a manner different than the chelate bonding between cyclopentadiene and nickel.

The nickel composition employed in the polymerization process is prepared by a variety of methods. In a preferred method, the catalyst composition is prepared by contacting an olefinic-nickel compound and the acid ligand. The preferred class of olefinic nickel compounds useful as catalyst precursors are zero-valent nickel compounds represented by the Formula IV:

(IV) 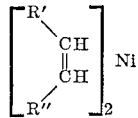

wherein R′CH=CHR″ has the significance as defined in Formula III. Illustrative nickel compounds of Formula IV are therefore biscyclooctadiene nickel (0) biscyclooctatetraene nickel (0), and bis(1,3,7-octatriene)nickel (0).

Other classes of olefinic nickel compounds useful as catalyst precursors are $\pi$-allyl nickel compounds wherein the nickel moiety is bonded to a $\pi$-allylic moiety characterized by delocalization of the electronic contribution of the $\pi$-allyl moiety among three contiguous carbon atoms. One suitable type of $\pi$-allyl nickel compound is represented by the Formula V:

(V) 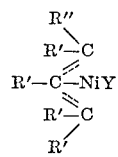

wherein R′ and R″ independently are hydrogen, alkyl, cycloalkyl, alkenyl, cycloalkenyl, aralkyl, aryl or alkaryl of up to 8 carbon atoms, Y is halogen, preferably halogen of atomic number from 17 to 35 inclusive, i.e., chlorine or bromine, alkoxy or alkanoyloxy of up to 10 carbon atoms, and the dotted line designation represents the electronic delocalization among the three illustrated contiguous carbon atoms, with the proviso that R″ together with one R′ may form a divalent alklene moiety of 2 to 10 carbon atoms, preferably 2 to 5, and of up to 3 additional olefinic double bonds. When considered as a whole, preferred $\pi$-allyl moieties have from 3 to 12 carbon atoms and are otherwise free from aliphatic unsaturation unless the $\pi$-allyl moiety is part of a closed ring system.

Illustrative of suitable $\pi$-allyl nickel halides of the above Formula V are $\pi$-allylnickel chloride, $\pi$-allylnickel bromide, $\pi$-crotylnickel chloride, $\pi$-methylallylnickel chloride, $\pi$-ethylallylnickel chloride, $\pi$-cyclooctadienylnickel chloride, $\pi$-cinnamylnickel bromide, $\pi$-phenylallylnickel chloride, $\pi$-cyclohexenylnickel bromide, $\pi$-cyclododecenylnickel chloride and $\pi$-cyclododecatrienylnickel chloride. Although the complex of the above Formula V and other $\pi$-allyl nickel halides probably exist independently in the form of a dimer, for convenience and simplicity the $\pi$-allyl nickel halides are herein depicted and named as monomeric species.

Other suitable $\pi$-allyl nickel compounds of Formula V are $\pi$-allylnickel acetate, $\pi$-methylallylnickel propionate, π-cyclooctenylnickel octoate, π-allylnickel methoxyate and π-allylnickel ethoxyate.

Other suitable types of π-allyl nickel compounds useful as catalyst precursors are bis-π-allyl nickel compounds represented by the Formula VI:

(VI)
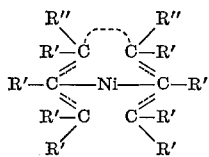

wherein R", R' and the dotted line designation have the same significance as defined in Formula V with the proviso that R" together with one R' of the same π-allylic moiety may form a divalent alkylene moiety of 2 to 10 carbon atoms, preferably of 2 to 5. When considered as a whole, preferred π-allyl moieties have from 3 to 12 carbon atoms and are otherwise free from aliphatic unsaturation unless the allyl moiety is part of a closed ring system. Illustrative of suitable bis-π-allyl nickel compounds of the above Formula VI are bis-π-allyl nickel, bis-π-methallyl nickel, bis-π-cinnamyl nickel, bis-π-octadienyl nickel, bis-π-cyclohexenyl nickel, π-allyl-methallyl nickel and bis-π-cyclooctatrienyl nickel.

The catalyst composition of the present invention is suitably pre-formed by contacting the catalyst precursors in an inert diluent, e.g., diluents employed for the polymerization process. In another modification, however, the catalyst precursor components are contacted in the presence of the ethylene reactant during the initiation of the polymerization process. By any modification, the catalyst precursor components are contacted at temperatures from about 25° C. to 100° C. In the reaction, the ratio of nickel component to benzoic acid derivative can be between 0.5:1 to 12:1 with a preferred range of 1:1 to 1:4.

The nickel catalyst is suitably employed as an unsupported material. In certain modifications, the nickel catalyst can be supported on an inorganic, solid catalyst carrier which is normally solid under reaction conditions and is heterogeneous, i.e., is substantially insoluble in the reaction medium. Illustrative of suitable inorganic, solid catalyst carriers are inorganic acidic oxides such as alumina and inorganic materials known as refractory oxides. Suitable refractory oxides include synthetic components as well as acid treated clays and similar materials such as kieselguhr or crystalline macroreticular aluminosilicates known in the art as molecular sieves. In general, synthetic catalyst carriers are preferred over natural occurring materials or molecular sieves. Exemplary synthetic catalyst carriers include alumina, silica-alumina, silica-magnesia, silica-alumina-titania, silica-alumina-zirconia, silica-titania-zirconia, silica-magnesia-alumina and the like. Particularly preferred catalyst carriers are siliceous refractory oxides containing up to 90% by weight of alumina, especially silica and silica-alumina.

When the catalyst composition is supported, the proportion of catalyst composition to carrier is not critical. In general, proportions of catalyst composition from about 0.01% to about 70% by weight, based on the catalyst carrier are satisfactory, with amounts of from about 0.1% to about 20% by weight, calculated on the same basis, being preferred. The catalyst composition is introduced onto the carrier in any suitable manner. In one modification, the supported catalyst composition is prepared by intimately contacting the pre-formed catalyst composition and the carrier in an inert diluent, preferably the same inert diluent employed for preparing the catalyst composition. In another modification, the catalyst compositions can be prepared directly on the catalyst carrier support surface by contacting the catalyst composition precursors in the presence of the catalyst carrier in a suitable inert diluent.

The amount of catalyst composition employed in the polymerization process is not critical. In general, amounts of catalyst composition from about 0.001% by weight to about 100% by weight based on ethylene are satisfactory with amounts from about 0.01% by weight to about 25% by weight on the same basis being preferred. The ethylene is contacted with the catalyst composition or the catalyst precursor components in the liquid phase in the absence or presence of reaction solvent or diluent which is liquid at reaction temperature and pressure. Illustrative suitable diluents and solvents are aromatic compounds such as benzene, toluene, chlorobenzene and oxygenated hydrocarbons such as dialkyl ketones, e.g., acetone, methyl ethyl ketone and ethyl butyl ketone; cycloalkyl ethers, e.g., dioxane, tetrahydrofuran and tetrahydropyran; and acyclic alkyl ethers, e.g., dimethoxyethane diethylene glycol, dimethyl ether and dibutyl ether. Other suitable solvents or diluents include nitriles such as acetonitrile and propionitrile; dialkylamides such as dimethylformamide; and dialkylsulfoxides such as dimethylsulfoxide. Still other suitable solvents or diluents comprise water or water containing a portion of a polar organic co-solvent. Alkanes and alkenes, including cycloalkanes and cycloalkenes, of from 5 to 20 carbon atoms such as butene-1, isopentane, pentene, cyclopentane, cyclohexane, isohexane, heptane, isooctane, decane, decene-1, dodecane, hexadecene and eicosane are also suitable reaction solvents. In some modifications of the polymerization process, a portion of the product suitably serves as reaction diluent and no added diluent is employed. When diluent is utilized, however, amounts up to about 30 moles of diluent per mole of ethylene are satisfactory. Preferred reaction diluents and solvents are aromatic hydrocarbons, lower dialkylsulfoxides, lower alkyl nitriles, alkanes, or mixtures thereof.

A particularly surprising aspect of the present invention is that the polymerization reaction can be suitably carried out in water. Thus water is a most preferred reaction medium for this invention. The water may but does not necessarily contain a polar organic solvent. Suitable mixtures of water and polar organic solvent vary by volume from about 20% to 80% organic solvent and from about 80% water to 20%.

The process is suitably conducted in an inert reaction environment so that the presence of reactive materials such as oxygen is desirably avoided. Reaction conditions are therefore substantially oxygen-free.

The precise method of establishing ethylene/catalyst contact is not critical. In one modification, the catalyst composition and the diluent are charged to an autoclave or similar pressure reactor, the ethylene feed is introduced, and the reaction mixture is maintained with agitation at reaction temperature and pressure for the desired reaction period. Another modification comprises passing, in a continuous manner, the ethylene reactant in liquid phase solution in the reaction diluent through a reaction zone in which a supported catalyst composition is maintained. By any modification, the polymerization process is conducted at moderate temperatures and pressures. Suitable reaction temperatures vary from about 25° C. to 250° C., but preferably from 30° C. to 80° C. The reaction is conducted at or above atmospheric pressure. The precise pressure is not critical, so long as the reaction mixture is maintained substantially in a non-gaseous phase. Typical pressures vary from about 10 p.s.i.g. to 5000 p.s.i.g. with the range from about 100 p.s.i.g. to 1000 p.s.i.g. being preferred.

The polymerization products are separated and recovered from the reaction mixture by conventional methods such as fractional distillation, selective extraction, filtration, adsorption and the like The reaction diluent, catalyst and any unreacted ethylene are recycled for further utilization.

During the polymerization process ethylene is converted to principally high molecular weight, polymer products i.e., polyethylene. The products are characterized by high linearity and crystallinity. Generally, the products are characterized by a high molecular weight, a linearity of less than 1 branch per 1000 monomer units and an inherent viscosity (0.10 g./100 ml. solvent at 135° C.) of between 1 to 10 dl./g. These products are materials of established commercial value. The polyethylenes can be used as wire and cable insulation, or for making containers, pipes, housewares, filaments, films and coatings.

To further illustrate the improved process of the invention and the novel catalyst composition, therefore, the following examples are provided.

EXAMPLE I

A solution of 2.1 g. of 2-mercaptobenzoic acid was prepared in a 5 ml. tetrahydrofuran-30 ml. toluene solvent mixture and was added to a solution containing 2.75 g. of biscyclooctadiene-1,5-nickel (0) dissolved in 100 ml. of toluene and stirred at ambient temperature for 18 hours. Excess n-hexane was then added to the reaction mixture to precipitate a black colored solid which was filtered, washed with additional n-hexane and dried under high vacuum. The yield of nickel containing catalyst was 1.06 g. To a solution of 25 ml. of n-hexane was added 0.275 g. of the above nickel catalyst and the mixture charged into a metal reactor. Ethylene monomer was charged to an initial pressure of 885 p.s.i. and the polymerization reaction was carried out at 60 to 65° C. for 2¼ hrs. The polymer formed was precipitated with methanol, filtered and dried in vacuo. The yield of linear polyethylene was 8.5 g.

EXAMPLE II

To a solution of 0.275 g. of biscyclooctadiene-1,5-nickel (0) and 10 ml. toluene was added 0.250 g. of 3,5-diaminobenzoic acid. The reaction mixture was diluted with 20 ml. of n-hexane and charged into a metal reactor. Ethylene monomer was charged to an initial pressure of 950 p.s.i. and the polymerization reaction was carried out at 65° C. for 3 hours. The polymer formed was precipitated with methanol, filtered and dried in vacuo. The yield was 2.0 g. of linear polyethylene.

EXAMPLE III

To a solution of 0.275 g. of biscyclooctadiene-1,5-nickel (0) and 10 ml. toluene was added 0.145 g. of 3-aminobenzoic acid. The reaction mixture was diluted with 20 ml. of n-hexane and charged into a metal reactor. Ethylene monomer was charged to an initial pressure of 950 p.s.i. and the polymerization reaction was carried out at 60 to 65° C. for 3 hours. The polymer formed was precipitated with methanol, filtered and dried in vacuo. The yield was 3.9 g. of linear polyethylene.

EXAMPLE IV

To a solution of 0.275 g. of biscyclooctadiene-1,5-nickel (0) and 10 ml. toluene was added 0.150 g. 4-cyanobenzoic acid. The reaction mixture was diluted with 15 ml. of n-hexane and charged into a metal reactor. Ethylene monomer was charged to an initial pressure of 850 p.s.i. and the polymerization reaction was carried out at 50° C. for 2 hours. The polymer formed was precipitated with methanol, filtered and dried in vacuum. The yield was 1.6 g. of linear polyethylene.

EXAMPLE V

To a solution of 0.275 g. of biscyclooctadiene-1,5-nickel (0) and 10 ml. toluene was added 0.165 g. of 4-N,N-dimethylaminobenzoic acid. The reaction mixture was diluted with 15 ml. of n-hexane and charged into a metal reactor. Ethylene monomer was charged to an initial pressure of 825 p.s.i. and the polymerization reaction was carried out at 60 to 65° C. for 3½ hours. The polymer formed was precipitated with methanol, filtered and dried in vacuo. The yield was 0.45 g. of linear polyethylene.

EXAMPLE VI

To a solution of 0.275 g. of biscyclooctadiene-1,5-nickel (0) and 10 ml. toluene was added 0.182 g. of 2,4-dimethoxybenzoic acid. The reaction mixture was diluted with 15 ml. of n-hexane and charged into a metal reactor. Ethylene monomer was charged to an initial pressure of 1000 p.s.i. and the polymerization reaction was carried out at 60 to 65° C. for 3½ hours. The polymer formed was precipitated with methanol, filtered and dried in vacuo. The yield was 0.32 g. of linear polyethylene.

EXAMPLE VII

To a solution of 0.275 g. of biscyclooctadiene-1,5-nickel (0) and 10 ml. toluene was added 0.140 g. of p-aminobenzoic acid. The reaction mixture was then diluted with 15 ml. of n-hexane and charged into a metal reactor. Ethylene monomer was then charged to an initial pressure of 850 p.s.i. and the polymerization reaction was carried out at 60° C. for 3 hours. The polymer formed was precipitated with methanol, filtered and dried in vacuo. The yield was 3.0 g. of linear polyethylene.

EXAMPLES VIII TO XI

In a manner similar to the procedures of Examples I to VII, each of the combinations of reaction products of nickel compounds and benzoic acid derivative ligand indicated in the table is used in a polymerization of ethylene to produce polyethylene of characteristics similar to those of the products of Examples I through VIII.

TABLE

| Nickel compound | Benzoic acid derivatives |
|---|---|
| VIII.... Bisacrylonitrile nickel | 2-mercaptobenzoic acid. |
| IX...... Bis-p-allyl nickel | 4-cyanobenzoic acid. |
| X....... Bis-p-methallyl nickel | 2,4-dimethoxybenzoic acid. |
| XI...... π-Cylooctenylnickel | 3-aminobenzoic acid. |

We claim as our invention:

1. A process of polymerizing ethylene by contact in an inert liquid diluent at a temperature of about 25° C. to 250° C. in the presence of a catalyst which is the product of the reaction of a nickel compound comprising an atom of nickel in complex with an olefinically unsaturated compound with a benzoic acid derivative ligand substituted with one or two of the same substituents selected from the group consisting of —SH, —CN, —N($R^1$)($R^2$), and —O$R^3$, where $R^1$, $R^2$ and $R^3$ can be hydrogen or alkyl of up to 8 carbon atoms.

2. The process of claim 1 wherein said catalyst is represented by the formula

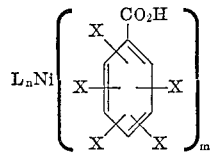

wherein one or two of the X's are the same substituent selected from the group consisting of —SH, —CN,

—N($R^1$)($R^2$)

and —O$R^3$, the remainder of the X's being hydrogen, wherein $R^1$, $R^2$, and $R^3$ can be hydrogen or alkyl of up to 8 carbon atoms, L is an olefinically unsaturated compound of from 2 to 20 carbon atoms, of up to 4 olefinic linkages, and of up to 3 carbocyclic rings, and $n$ and $m$ are selected from numbers of from 1 to 3.

3. The process of claim 1 wherein said nickel compound is selected from the group consisting of nickel (0) compositions and nickel (I) compositions.

4. The process of claim 1 wherein said nickel compound is represented by a formula selected from the group consisting of

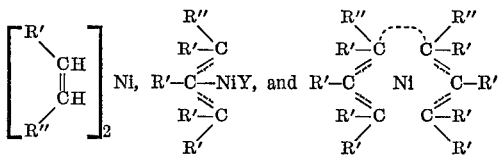

wherein R″ and R′ independently are hydrogen, alkyl, cycloalkyl, alkenyl, cycloalkenyl, aralkyl, aryl or alkaryl of up to 8 carbon atoms and Y is halogen of atomic number 17 to 53 inclusive, alkoxy or alkanoyloxy of up to 10 carbon atoms with the proviso that R″ together with one R′ may form a divalent alkylene moiety of 2 to 10 carbon atoms and of up to three additional olefinic double bonds.

5. The process of claim 1 in which said nickel compound is reacted with said acid ligand in a molar ratio of nickel compound to ligand of from about 0.5:1 to 1:12.

6. The process of claim 1 in which said nickel compound is reacted with said acid ligand in a molar ratio of nickel compound to ligand of from about 1:1 to 1:4.

7. The process of claim 1 in which said nickel compound is reacted with said acid ligand at a temperature of from about 25° C. to 100° C.

8. The process of claim 1 in which said catalyst is supported on an inorganic, solid carrier.

9. The process of claim 8 in which said carrier is selected from the group consisting of inorganic acidic oxides and siliceous refractory oxides.

10. The process of claim 1 in which said catalyst is employed in an amount from about 0.001% by weight to about 100% by weight based on the ethylene.

11. The process of claim 10 in which said catalyst is employed in an amount from about 0.01% by weight to about 25% by weight based on the ethylene.

12. The process of claim 1 in which said polymerization process is carried out at a temperature of about 30° C. to 80° C.

13. The process of claim 1 wherein said polymerization process is carried out at a pressure from about 10 p.s.i.g. to 5000 p.s.i.g.

14. The process of claim 13 wherein said polymerization process is carried out at a pressure from about 100 p.s.i.g. to 1000 p.s.i.g.

15. The process of claim 1 wherein said nickel compound is biscyclooctadiene-1,5-nickel (0).

References Cited

UNITED STATES PATENTS 3,497,498    2/1970    Dawans et al. _____ 260—94.9 B

OTHER REFERENCES

Kirk-Othmer Encyclopedia of Chemical Technology, 2nd ed., vol. 1, pp. 238–39, Interscience, New York (1963).

JOSEPH L. SCHOFER, Primary Examiner

A. HOLLER, Assistant Examiner

U.S. Cl. X.R.

260—94.9 B